United States Patent [19]

von Pragenau

[11] Patent Number: 4,890,946
[45] Date of Patent: Jan. 2, 1990

[54] TURBOMACHINERY SHAFT INSERT

[75] Inventor: George L. von Pragenau, Huntsville, Ala.

[73] Assignee: The United States of America as represented by the United States National Aeronautics and Space Administration, Washington, D.C.

[21] Appl. No.: 358,028

[22] Filed: May 26, 1989

[51] Int. Cl.⁴ .............................................. B25G 3/00
[52] U.S. Cl. .................................... 403/13; 403/289; 403/258; 403/24
[58] Field of Search ............... 403/289, 258, 261, 260, 403/257, 359, 24, 30, 28, 13

[56] References Cited

U.S. PATENT DOCUMENTS

| | | | |
|---|---|---|---|
| 2,836,448 | 5/1958 | King | 403/258 |
| 2,901,214 | 8/1959 | Slemmons | 403/260 X |
| 3,865,437 | 2/1975 | Crosby | 403/289 X |

Primary Examiner—Andrew V. Kundrat
Attorney, Agent, or Firm—William J. Sheehan; John R. Manning; Charles E. B. Glenn

[57] ABSTRACT

An insert for a hollow rotatable shaft on the end of which an impeller is mounted, the insert having a first cylindrical portion receivable within the end of the shaft. The insert includes a radially extending portion adjacent the end of the shaft having an annular wall including radially inner and outer surfaces for engaging tightly similar surfaces in a recess formed in the impeller to provide inner and outer pilot surfaces. The insert also includes a tubular extension which is received within a bore in the impeller, the tubular extension having spaced longitudinally extending slits for permitting the extension together with radially extending hook-like tongues thereon to be received within radial slots in the bore of the impeller to lock the impeller to the insert.

11 Claims, 1 Drawing Sheet

TURBOMACHINERY SHAFT INSERT

ORIGIN OF THE INVENTION

The invention described herein was made by an employee of the United States Government and may be manufactured and used by or for the government for government purposes without the payment of any royalties thereon or therefor.

BACKGROUND OF THE INVENTION

This invention relates to an insert for use with a disc or impeller mounted on a rapidly rotating hollow shaft such as utilized in high speed turbomachinery, and more particularly to an insert which aids in securing an impeller mounted in overhung fashion to a rotatably driven hollow shaft in high speed turbomachinery such as the high pressure oxygen turbopump of the space shuttle main engine, the insert having a pair of annular surfaces cooperating with receiving surfaces in the impeller to provide a double pilot remaining tight at all speeds to aid in the elimination of whirl instability in such turbomachinery.

The high pressure oxygen turbopump used in the space shuttle main engine uses duplex ball bearings, i.e., a pair of bearings mounted closely adjacent each other, near each end of the rotor. A damping seal such as that disclosed in U.S. Pat. No. 4,545,586, adjacent the pump end of the rotor besides reducing leakage between the fixed and rotating portions also damps rotor lateral motion and thus shares the bearing load in the pump portion of the turbopump. The duplex bearings are each a pair of ball bearings having an axial preload force applied thereto to avoid ball skidding and wear. The preload is provided by a spring located between the outer races of each pair of duplex ball bearings. The ball bearing prevents seal rubbing and the damping seal eliminates instability due to whirl, that is, the orbiting of the rotor shaft due to fluid forces acting to urge the shaft tangentially, when radially from the rotational center, creating an eccentric rotation.

Due to ball bearing wear the operational time of the high pressure oxygen turbopump of the space shuttle main engine is limited, thereby hindering the space shuttle program. The excessive ball bearing wear is a result of excessive lateral or side loads. Such side loads frequently may not be shared equally between the bearing units of one duplex bearing pair because of shaft bending, deformation of the bearing holders and other factors. The forces on the rapidly rotating impeller may cause the side loads on a single bearing to be in excess of twice the bearing axial preload, which is substantially greater than the generally recommended one-half or one-third loading. Thus, the balls are forced up and down the shoulders of the bearing races cyclically as the ball train rotates at approximately 43 percent of the shaft speed. These excursions of the balls cause ball skidding, excessive heating and excessive wear of the bearings. Additionally, during turbopump start-up and shut-down axial overloads are present which require that the balls have large contact angles to counteract these axial forces. On the other hand, the large lateral or side loads during operation require small contact angles if over-stress is to be prevented. Where the outer races are permitted to float and the balls have large contact angles, spinning of the outer races occurs and load shearing by the bearing with the damping seal is limited. Accordingly, compromises in the bearing design have been made which have resulted in the aforesaid limitations in bearing wear.

In copending U.S. patent application Ser. No. 364,743 filed 5-26-89 there is proposed damping seals, damping bearings and support means for the ball bearings of the rotor of such high speed machinery which reduces a substantial number of these problems by preventing tilting and spinning of the outer races; aids in supporting the shaft at low speeds; avoids and counteracts radial loading of the bearings while absorbing axial loads at high speed; and eliminates a substantial amount of the whirl driving forces. However, there are other whirl drivers in such high speed turbomachinery. For example, the impeller is rotatably connected to the shaft by a spline, and spline friction is a potential source for tangential forces which result in whirl instability. This is especially a problem where the impeller projects a substantial amount beyond the end of the shaft such as in the case with a centrifugal impeller of the type used in the high pressure oxygen turbopump of the space shuttle main engine.

SUMMARY OF THE INVENTION

Consequently, it is a primary object of the present invention to provide an insert for insertion into the end of a hollow rotating shaft for aiding in the mounting of a rotor such as an impeller on the shaft, the insert having means for securing the rotor thereto and for supporting the rotor during the entire speed range of the shaft.

It is another object of the present invention to provide an insert for the end of a hollow rotatable shaft to which an impeller or the like is secured, the insert having impeller securing means and a pair of annular support surfaces which engage cooperatively with surfaces within an annular recess in the impeller to provide a double pilot, one pilot being effective at assembly and low speeds, and the other being effective at high speeds.

Accordingly, the present invention provides an insert for a hollow rotatable shaft on the end of which an impeller or similar rotor is mounted, the insert having a first cylindrical portion receivable within the end of the shaft, a radially extending portion adjacent the end of the shaft having an annular flange facing remote from the shaft and received within a recess in the impeller, the flange having radially inner and outer surfaces for engaging tightly radial walls of the recess, and a tubular extension which is receivable securely within a bore formed in the impeller. The tubular extension is hollow and includes axial slits for permitting the extension together with radially extending hook-like tongues thereon to be received within radial slots in the end of the bore to lock the impeller to the insert. The radially inner and outer surfaces of the tight fitting flange form a double pilot with the walls of the recess, the radially outer surface of the flange acting to guide and center the impeller relative to the shaft at assembly and low speed, while the radially inner surface acts to guide and center the impeller relative to the shaft at high speed.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
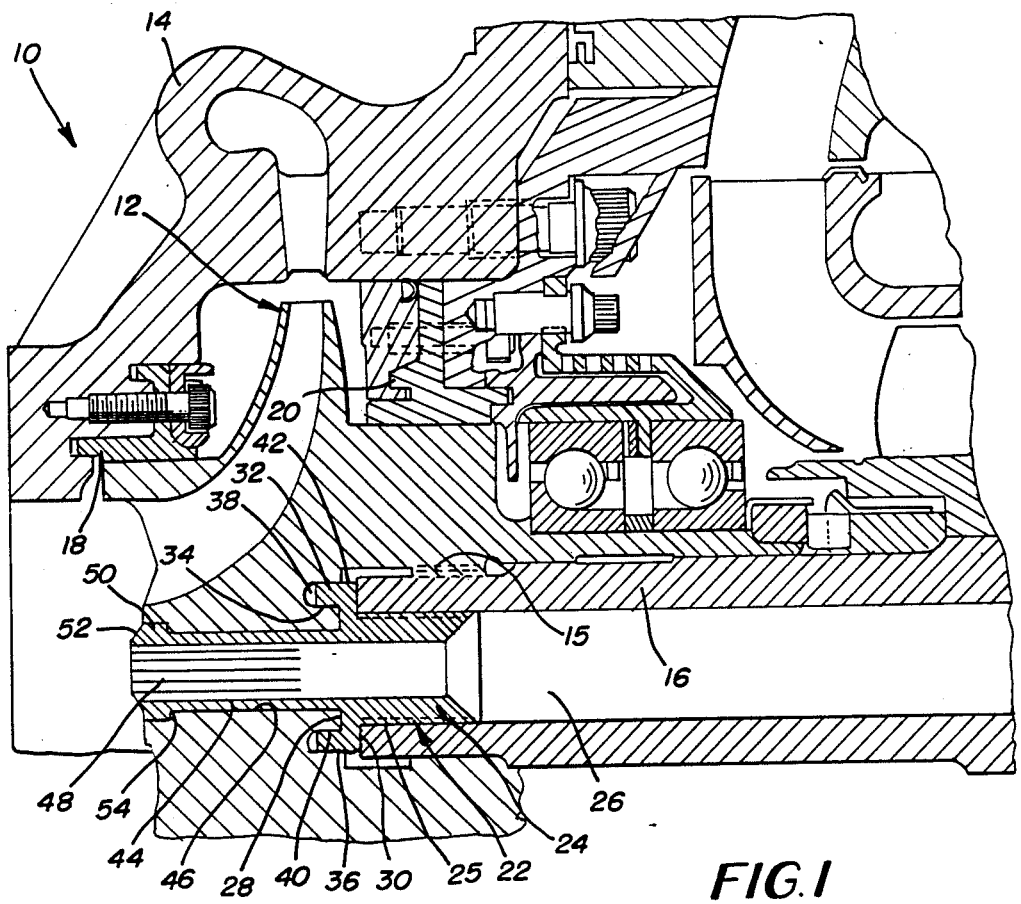
FIG. 1 is a partial cross sectional view of the high pressure pump portion of a turbopump incorporating a shaft insert constructed in accordance with the principles of the present invention.
Figure 2:
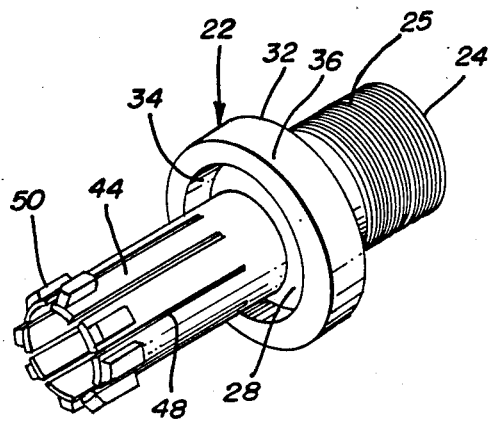
FIG. 2 is a perspective view of the insert of the present invention.

Referring now to the drawings, a partial cross sectional view of the high pressure pump portion 10 of a turbopump used in the space shuttle main engine is illustrated, the pump having an impeller 12 mounted within a shroud or housing 14. The impeller is connected by a spline 15 to a hollow shaft 16 open at the pump end thereof rotatably driven at a speed of approximately 30,000 rpm by a turbine (not illustrated) mounted on the shaft 16 remote from the pump portion of the turbopump. Annular damping seals 18 and 20 for restricting fluid leakage and damping rotor whirl are fastened between the rotatable impeller 12 and the fixed housing 14 adjacent the inlet and discharge portions of the impeller, the seals 18 and 20 being similar to the damping seals forming the subject matter of my aforesaid U.S. Pat. No. 4,545,586, modified as described in accordance with my aforesaid copending application No.

As aforesaid, the frictional forces of the spline connection 15 between the shaft 16 and the impeller 12 is a potential whirl driver. The damping seals attenuate the whirl, but it is desirable to prevent spline friction from becoming a whirl driver. To this end the present invention provides a hollow insert 22 having a first cylindrical portion 24 receivable within the hollow 26 at the end of the shaft 16 and secured therein by threads 25 or the like. The insert 22 includes a radially extending web 28 having a surface 30 thereof which abuts the end of the shaft 16. At the outer periphery of the web 28 an annular flange 32 is formed, the flange being defined by a cylindrical wall projecting in the direction facing remotely from the shaft 16 and having inner and outer annular surfaces 34, 36 respectively.

The flange 32 is received within a recess 38 in the impeller 12 spaced axially from the shaft 16, the recesses having inner and outer wall surfaces 40, 42 respectively which tightly abut the respective surfaces 34 and 36 of the flange 32 of the insert 22. The outer surface 36 of the insert acts as a low speed pilot against the surface 42 to guide and center the impeller 12 relatively to the shaft 16 at assembly and at low rotational speeds, while the inner surface 34 of the insert acts as a high speed pilot with the surface 40 when centrifugal growth of the impeller occurs during high speed rotation of the turbopump. In contrast with prior art arrangements where the piloting or guiding became looser and less effective at high speed, in the arrangement here disclosed as the speed increases the piloting becomes stronger, i.e., tighter so that it is tight at low speeds and at high speeds.

Extending from the central portion of the web 28 in the direction away from the first cylindrical portion 24 is another cylindrical portion 44 which is received within the central bore 46 of the impeller 12. The portion 44 is tubular and has a series of longitudinally extending spaced apart slits 48 extending through the wall about its periphery, the slits extending substantially the entire length of the portion 44. The free end of the portion 44 has a plurality of spaced apart radially extending narrow tab or tongue members 50, the tongue members having inclined leading edges 52. The tongue members 50 are received within similarly shaped recesses or slots 54 in the wall of the bore 46 at the end of the impeller 12 and aids in mechanically securing the impeller on the shaft 16. During assembly, the slits 48 permit the tongue members 50 to be squeezed radially inwardly so that they may be received through the bore 46, aided by the inclined edges 52, until they reach the recesses 54 where they may then snap radially outwardly when the impeller is axially seated in the turbopump.

With the insert of the present invention, not only do the pilots eliminate spline friction from becoming a whirl driver as it provides a tight guide and centering means at all speeds, but it also overcomes the piloting problems of overhung impellers and other rotating discs, i.e., when the impeller or disc projects beyond the end of the shaft as in the preferred embodiment. Effectively, it is a hollow bolt which secures the impeller 12 to the hollow shaft 16 by securely gripping the impeller 12 and the shaft 16, and guides and centers the impeller during the entire speed range thereof. Additionally, the tongues 50 also tighten in the recesses 54 as the speed increases.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. An insert for insertion into an axial bore at the end of a hollow rapidly rotatable shaft having a rotor mounted at said end, said rotor and said shaft having cooperating connecting splines and said rotor having a bore opening into the bore of said shaft, said insert comprising a hollow cylindrical portion receivable within said axial bore, means for securing said cylindrical portion within said axial bore, a web adjacent said cylindrical portion abutting said end of said shaft, said web having an outer peripheral annular flange extending in a direction remote from said shaft, said flange having a radially inner annular surface and a radially outer annular surface, said rotor having an annular recess spaced from the bore thereof, said recess including a radially inner surface for tightly abutting the radially inner annular surface of said flange and a radially outer surface for tightly abutting the radially outer annular surface of said flange, a tubular portion extending from said web and received within the bore of said rotor, and securing means for fastening said tubular portion to said rotor.

2. An insert as recited in claim 1, wherein said securing means comprises a plurality of radially extending tongues spaced apart about the periphery of said tubular portion, and said rotor includes a plurality of slots recessed in the wall of the bore of said rotor for receivably grasping respective tongues.

3. An insert as recited in claim 2, wherein said tubular portion has an outer periphery of substantially the same diameter as the bore of said rotor, and includes a plurality of circumferentially spaced longitudinally extending slits extending therethrough for permitting flexure of said tongues in a radially inward direction for entry through said bore during assembly until received in said slot.

4. An insert as recited in claim 3, wherein said tongues are disposed at the end of said tubular portion remote from said shaft.

5. An insert for providing two pilots for guiding and centering an impeller relative to a shaft upon an end of which the impeller is mounted, said impeller and shaft have having first axially extending bores opening one onto the other and said impeller having a second bore receiving said shaft with a spline connection therebetween, said insert comprising a cylindrical portion secured within the bore of said shaft, an impeller securing portion received within the first bore of said impeller, and a pilot portion intermediate said cylindrical portion and said securing portion, said pilot portion comprising an annular wall disposed externally of said first bores and having radially inner and outer pilot surfaces, recess means formed in said impeller adjacent said end of said shaft for receiving said pilot surfaces, and said recess having annular surfaces against which said pilot surfaces tightly abut.

6. An insert as recited in claim 5, wherein said annular wall includes a web extending from said cylindrical portion, and said web being disposed intermediate said shaft and said recess.

7. An insert as recited in claim 6, wherein said securing portion comprises a tubular member extending from said web in a direction away from shaft.

8. An insert as recited in claim 7, wherein said tubular member includes a plurality of radially extending tongues spaced apart about the outer periphery thereof, said tongues extending longitudinally only partly along the longitudinal extent of said tubular portion, said impeller having slots formed in the wall defining the first bore thereof for securely receiving and gripping said tongues.

9. An insert as recited in claim 8, wherein the outer periphery of said tubular member substantially abuts the wall defining the first bore of said impeller, and biasing means for permitting said tongues to enter through said first bore from the end of said impeller adjacent said shaft.

10. An insert as recited in claim 9, wherein said biasing means comprises a plurality of circumferentially spaced longitudinally extending slits formed radially through the tubular member for permitting flexure of said tongues in a radially inward direction for entry through said bore.

11. An insert as recited in claim 10, wherein said tongues are disposed at the end of said tubular member remote from said shaft.

* * * * *